United States Patent
Goodman et al.

[11] Patent Number: 5,874,744
[45] Date of Patent: Feb. 23, 1999

[54] PROCESS AND APPARATUS FOR RETRIEVING INFORMATION FROM A STORAGE PHOSPHOR SCREEN

[75] Inventors: Claude A. Goodman, Lake Oswego; Daniel N. Wildermuth, Portland, both of Oreg.

[73] Assignee: Air Techniques, Inc., Hicksville, N.Y.

[21] Appl. No.: 855,778

[22] Filed: May 12, 1997

[51] Int. Cl.$^6$ ............................................. G03B 42/02
[52] U.S. Cl. ................................... 250/584; 250/484.4
[58] Field of Search ................................. 250/585, 584, 250/586, 483.1, 484.4

[56] References Cited

U.S. PATENT DOCUMENTS

| | | | |
|---|---|---|---|
| 4,752,557 | 6/1988 | Tsuchino et al. | 250/483.1 |
| 4,944,026 | 7/1990 | Arakawa et al. | 250/484.4 |
| 5,208,459 | 5/1993 | Morrone et al. | 250/484.4 |
| 5,227,254 | 7/1993 | Brixner et al. | 250/483.1 |
| 5,444,266 | 8/1995 | Takeda et al. | 250/586 |
| 5,534,702 | 7/1996 | Trutna, Jr. et al. | 250/484.4 |

*Primary Examiner*—Constantine Hannaher
*Assistant Examiner*—Darren M. Jiron
*Attorney, Agent, or Firm*—Louis E. Marn

[57] ABSTRACT

There is disclosed a process and apparatus for receiving and reproducing radiographic information from an anisotropic storage phosphor screen including an auto-collimating photostimulable phosphor layer of a material selected from the group consisting of europium activated barium fluorobromide, europium activated potassium chloride, indium activated potassium bromide or indium activated rubidium iodide, which absorbs impinging ionizing radiation emanating from or passing through an object to be imaged, a collimated or focused interrogating beam of photons directed parallel to the columnar structure of the screen to stimulate the trapped electrons within the storage phosphor to release the energy stored therein as luminescent photons, an opto-electro-mechanical assembly to achieve a raster scan of the interrogating beam over the area of the phosphor screen, a detector for converting the luminescent photons into electrical signals, and a computer to record and/or display the intensity versus positional information as a radiographic image of the object.

2 Claims, 3 Drawing Sheets

PROCESS AND APPARATUS FOR RETRIEVING INFORMATION FROM A STORAGE PHOSPHOR SCREEN

BACKGROUND OF THE INVENTION

1. Field of the Invention

The invention relates to a process and apparatus for interrogating a storage phosphor screen, and more particularly to an improved process and apparatus for retrieving information of improved resolution and sensitivity from a storage phosphor screen.

2. Description of the Prior Art

Ionizing radiation images have been and continue to be used as basic investigative tools in medicine, industry and science. There are two general categories of phosphor-based imaging systems. The first employs phosphors chosen from the scintillators wherein the incident ionizing radiation interacts with the phosphor to immediately produce a visible-light image. The second employs photostimulable storage phosphors wherein the phosphor temporarily stores the incident radiation patterns for retrieval as infrared or visible-light images an interval of time later by scanning or flooding with electromagnetic radiation, such as described in: U.S. Pat. No. 3,859,527 to Luckey, or U.S. Pat. No. 4,239,968 to Kotera, et al., or U.S. Pat. No. 5,065,023 to Lindmayer, or U.S. Pat. No. 4,733,090 to DeBoer, et al.

In both types of system, there is an inverse relationship between two fundamental determinants of image quality, namely: resolution, referring to the sharpness or the spatial detail evident in an image; and sensitivity, referring to the energy conversion efficiency from the ionizing radiation to the luminescent image. Generally, sensitivity is increased by using a thicker phosphor layer thereby increasing the probability of interaction between the radiation and the phosphor layer, but the resulting luminescence is more widely scattered thereby decreasing resolution. Conversely, increasing resolution by decreasing phosphor thickness decreases the probability of interaction, and therefore, sensitivity.

Several methods to improve this reverse relationship have been disclosed, such as, for example in U.S. Pat. No. 4,637,898 to DeBoer et al.; U.S. Pat. No. 4,906,850 to Beerlage; U.S. Pat. No. 5,410,144 to Mouyen; U.S. Pat. No. 5,065,023 to Lindmayer; and U.S. Pat. No. 5,124,588 to Soltani et al.

There remains the continuing need for improved process and apparatus to retrieve information of improved spatial resolution and sensitivity with lower exposure from a storage phosphor screen.

OBJECT OF THE PRESENT INVENTION

It is an object of the present invention to provide an improved process for retrieving information from a storage phosphor screen.

Another object of the present invention is to provide an improved process for retrieving information from a storage phosphor screen of improved spatial resolution and sensitivity.

Yet another object of the present invention is to provide an improved process for retrieving information from a storage phosphor screen of improved spatial resolution and sensitivity with a lower exposure.

Still another object of the present invention to provide an improved apparatus for retrieving information from a storage phosphor screen.

Another object of the present invention is to provide an improved apparatus for retrieving information from a storage phosphor screen of improved spatial resolution and sensitivity.

Yet another object of the present invention is to provide an improved apparatus for retrieving information from a storage phosphor screen of improved spatial resolution and sensitivity with a lower exposure.

SUMMARY OF THE PRESENT INVENTION

These and other objects of the present invention are achieved by a process and apparatus for receiving and reproducing radiograpic information from an anisotropic storage phosphor screen including an auto-collimating photostimulable phosphor layer of a material selected from the group consisting of europium-activated barium fluorobromide, europium-activated potassium chloride, indium-activated potassium bromide and indium-activated rubidium iodide, which absorbs impinging ionizing radiation emanating from or passing through an object to be imaged, a collimated or focused interrogating beam of photons directed parallel to the columnar structure of the screen to stimulate the trapped electrons within the storage phosphor to release the energy stored therein as luminescent photons, an opto-electro-mechanical assembly to scan the interrogating beam over the area of the phosphor screen, a detector for converting the luminescent photons into electrical signals, and a computer to record and/or display the intensity versus positional information as a radiographic image of the object.

BRIEF DESCRIPTION OF THE DRAWINGS

Further objects and advantages of the present invention will become apparent on consideration of the following detailed disclosure thereof, especially when taken with the accompanying drawings wherein.

DETAILED DESCRIPTION OF THE INVENTION

Figure 1:
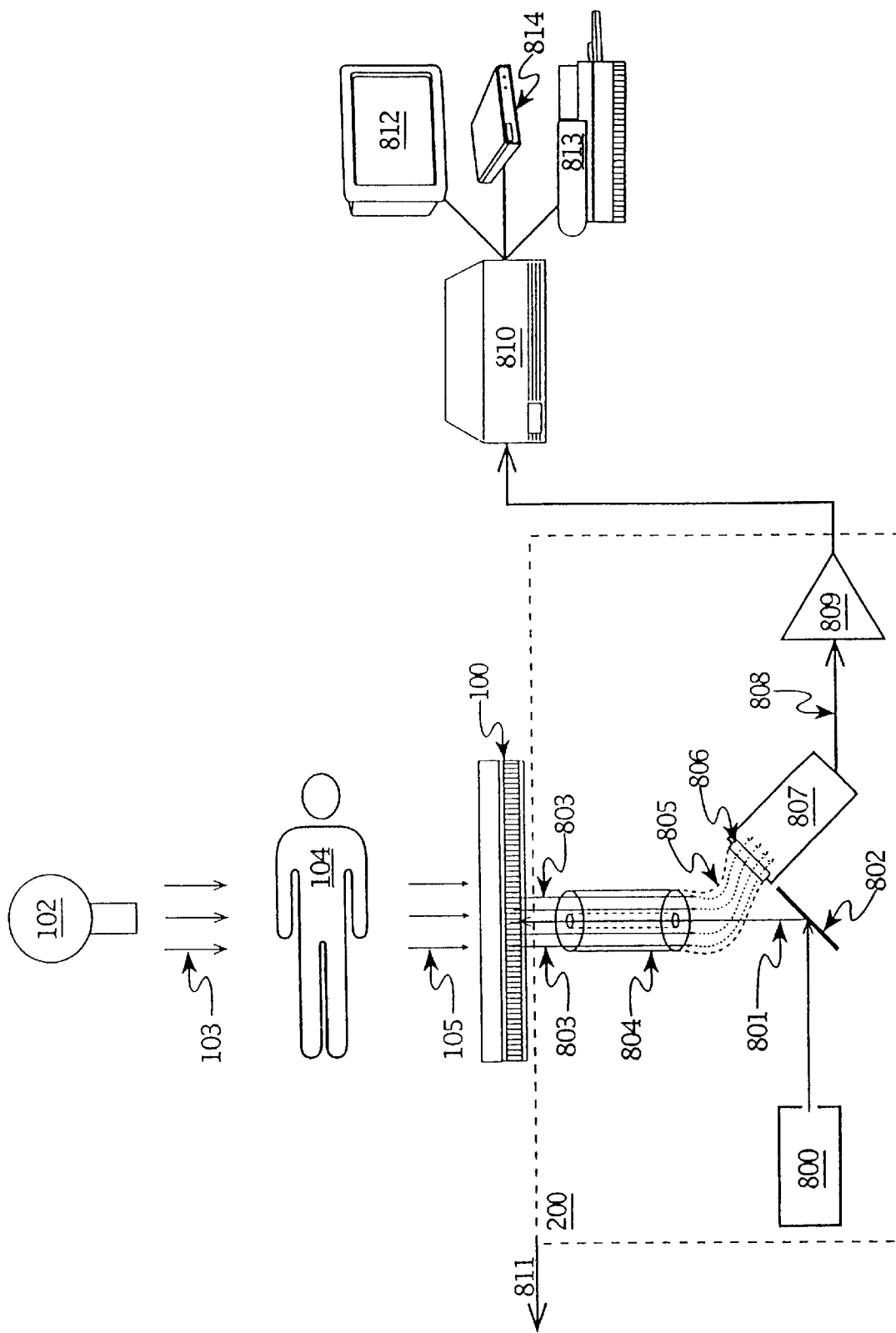
FIG. 1 is a schematic diagram of an imaging system including an anisotropic auto-collimating storage phosphor screen.

Referring now to the drawings and particularly FIG. 1, there is illustrated an imaging system incorporating an anisotropic, auto-collimating phosphor screen 100 coupled to a visible-light sensing device 200. The anisotropic, auto-collimating phosphor screen is fabricated of an electron trapping storage phosphor material selected from the group consisting of europium-activated barium fluorobromide, europium-activated potassium chloride, indium-activated potassium bromide and indium activated rubidium iodide. The ionizing radiation source 102, e.g., X-ray source, is arranged so that incident ionizing radiation 103 is directed approximately parallel to the structural orientation of the screen 100. The object to be imaged 104 is placed between the source 102 and the screen 100 such that the transmitted ionizing radiation 105 containing the desired image information is also directed approximately parallel to the structural orientation of the screen 100. The visible light 803 ultimately generated by the phosphor is preferentially directed through its columnar structure to the sensor 200 thereby decreasing the spread of light and improving resolution when compared to an isotropic phosphor screen of the same thickness.

The source for the interrogating photon beam used to stimulate the emission of luminescent photons 800 is a diode laser with a center wavelength of 650 nm and a power output of 10 mW generating a coherent beam 801 of a size and energy distribution profile suitable for the anisotropic, auto-collimating storage phosphor screen. For example, according to the Niquist Criterion, if the imaging system is to have a spatial resolution of 10 line-pairs per mm, then the effective beam diameter must be 50 microns or less. Thus, a 50 micron Gaussian beam profile with an energy density in the range of 1 to 10 ergs per pixel is necessary to stimulate the majority of trapped electrons to emit stored energy as luminescent photons with an emission spectrum in the range of 300 to 500 nm.

Optical elements 802, e.g. mirrors, lenses or optical fibers, are used to direct this interrogating beam 801 approximately parallel to the screen structure, such that it is within the acceptance angle of the columnar structure of the screen 100. The beam 801 is modulated as it traces a raster scan across the surface of the screen 100 to produce a two-dimensional coordinate map of luminescent intensity. In one embodiment, a coaxial arrangement of optical fibers 804 is arranged so that the central sub 50 micron fiber is coupled to the laser and the circumferential fiber bundle is coupled through a blue optical filter 806 with a pass-band between 300 to 500 nm to a photomultiplier tube 807 translated in a raster mode by relative movement 811 with respect to the phosphor screen 100.

The thus photostimulated luminescent photons 803 emerge on a path coaxial 804 with the interrogating beam 801. An optical coupler 805 directs such luminescent photons through the band-pass filter 806 to a photomultiplier tube or equivalent photon detector 807. The resulting time variant, and hence image intensity and position representative electrical signal 808 is amplified 809 and then collected for reconstruction into an image by computer 810. Positional information reconstruction is generated from the synchronized translation 811 of the interrogating beam 801 relative to the screen 100. The computer 810 includes options for viewing 812, printing 813 and transmitting 814 the resulting image.

In alternative embodiments, as known to those skilled in the art, the relative movement needed to achieve the raster scan may be accomplished by use of a rotating drum, linearly translated platen, and/or by the use of one or a pair of oscillating low inertia mirrors or rotating polygon mirrors. The key features of readout are that the incident interrogating photon beam be disposed parallel to the columnar structure of the auto-collimating storage phosphor screen 100, and that the detector 807 be disposed preferentially along the same axis to maximize reception of the collimated luminescent photon signal.

Figure 2:
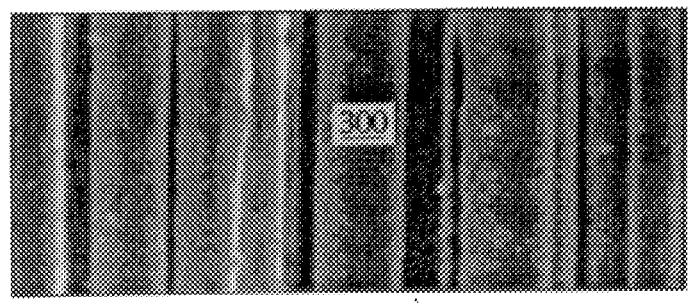
FIG. 2 is a scanning electron micrograph of the anisotropic auto-collimating phosphor screen.

Referring now to FIG. 2, there is illustrated the SEM of a phosphor layer 310 of an anisotropic, auto-collimating phosphor material comprised of phosphor columns 300 with intervening gaps 301. The gaps between the columns have a width of at least one half of a wavelength of the light, that is, at least 500 nm, so that adjacent phosphor columns are effectively optically, as well as mechanically, decoupled from each other.

Figure 3:
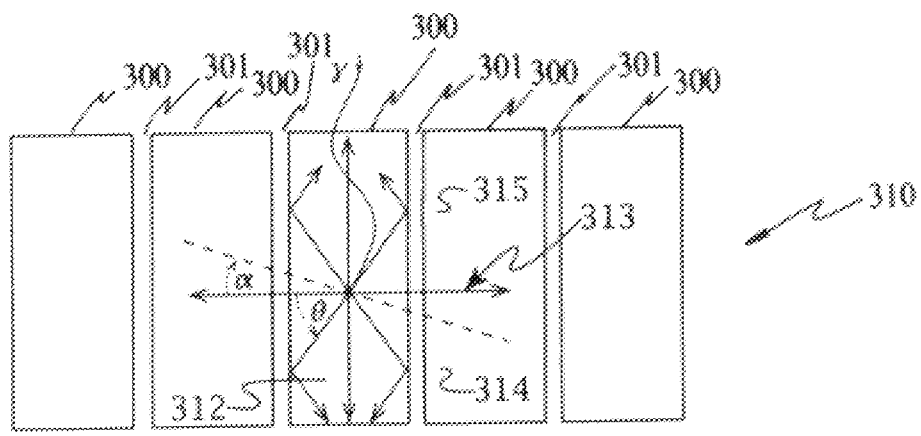
FIG. 3 is a schematic diagram of the optical performance of the anisotropic auto-collimating phosphor screen of FIG. 2.

In FIG. 3, the phosphor columns 300 of the anisotropic, auto-collimating phosphor screen layer 310 is schematically illustrated to reveal its optical properties. A quantum γ or particle of ionizing radiation 311 representing image information enters the phosphor column 300 from the top. When the ionizing radiation collides with the phosphor's atomic constituents, energy transfer occurs which ultimately results in the generation of multiple quanta of visible light photons of luminescence that traverse the phosphor along paths represented by photon rays 312, 313, 314, and 315. Since the phosphor column 300 has a higher index of refraction than gaps 301, total internal reflection will occur for luminescent photons of angles of incidence θ greater than critical angle α as defined by:

$$\sin \alpha = n2/n1$$

where n2 and n1 are the indices of refraction of the gap material 301, e.g., air, and the phosphor material 300, respectively.

For example, the storage phosphor europium-activated barium fluorobromide, BaFBr:Eu, has an index of refraction of 1.7, and air an index of refraction of 1.0, and thus, α=36°. For all luminescent photons whose angles of incidence are greater than the critical angle, the total fraction of reflected light may be calculated:

$$\int_{36°}^{90°} \sin(\theta) d\theta = 0.81$$

Figure 4:
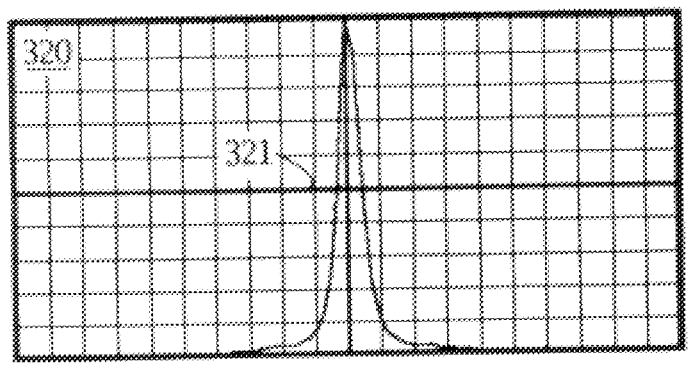
FIG. 4 is a graph of a point spread function of the anisotropic auto-collimating phosphor screen of FIG. 2.

Therefore, with the exception of a small fraction of photon rays 313 which do not experience total internal reflection, most of the luminescent photons are collimated in the phosphor column 30 of the anisotropic phosphor layer 310. In FIG. 4, such phenomenon is depicted in the point spread function graph 320 illustrating spatial distribution 321 of luminescent photons from their origin as measured at the surface of the screen.

Using such a model, spatial resolution of the imaging system depicted in FIG. 1 using an anisotropic, auto-collimating screen is maximized when: (1) the incident energy is parallel to the orientation of the columns 300; (2) the materials for the columns 300 and gaps 301 are chosen to maximize internal reflection of light by minimizing the critical angle α; and (3) the detector 200 is positioned with respect to the screen 100 to take advantage of the directional nature of its luminescence.

Figure 5:
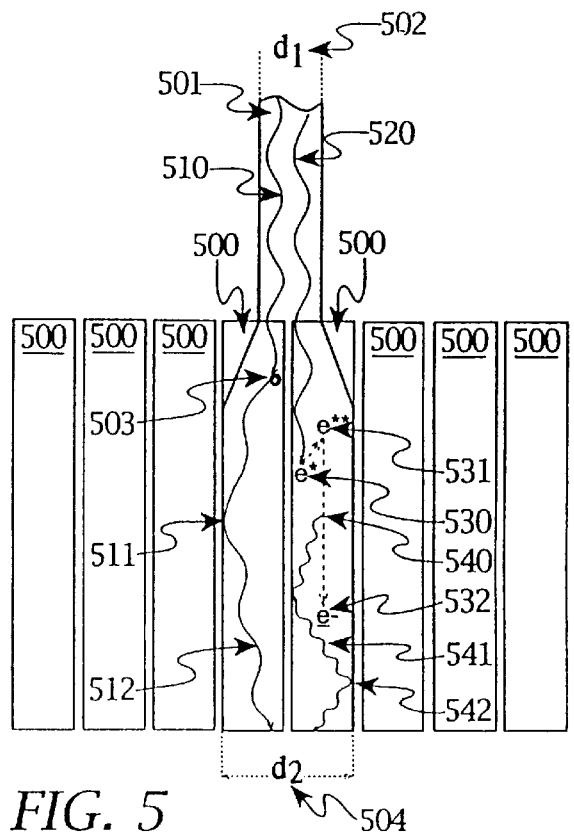
FIG. 5 is a schematic diagram of the optical performance the anisotropic auto-collimating photostimulable phosphor screen to an incident laser excitation beam and a resulting photostimulated luminescent photon.

Referring now to FIG. 5, there is illustrated a schematic diagram depicting optical performance of an anisotropic, auto-collimating photostimulable phosphor screen 500 to an incident interrogating laser beam 501 with a wavelength of greater than 500 nm, and preferably about 650 nm. The phosphor having been previously charged to its excited state by some incident ionizing radiation contains image information. The paths of two coherent laser photons, 510 and 520 illustrate the essential phenomena of the present invention. Following the downward path of laser photon 510, the laser beam 501 begins to diverge from its incident beam diameter di of 50 microns or less as it enters the auto-collimating screen's phosphor layer 500, due to atomic scattering 503.

However, laser photon 510 is channeled by total internal reflection 511, provided that its angle of incidence is greater than the critical angle, as hereinabove discussed. Thus, the reflected photon 512 remains within cylindrical beam profile whose maximum diameter d2 is not significantly greater than the incident beam diameter, due to the auto-collimating function of the anisotropic phosphor layer. Consequently the stimulating laser beam energy is confined to a small volume of the phosphor screen, which results in well-defined image pixels of high resolution and sensitivity.

Following the downward path of laser photon 520, it is observed to interact with an ionizing radiation induced, trapped electron e*530, imparting a quantum of energy sufficient to raise the electron, e**531 to the conduction band. Shortly thereafter, e**531 spontaneously decays radiatively back to its ground state e-532 with the emission 540 of a luminescent photon 541, whose wavelength, less than 500 nm, is shorter than that of the stimulating laser photon 520. The resultant photostimulated luminescent photon 541 is channeled by total internal reflection 542 by the auto-collimating function of the anisotropic phosphor layer according to the regime described in FIG. 3.

The spatial resolution of the imaging system depicted in FIG. 1 using an anisotropic, auto-collimating storage screen is maximized when: (1) the incident ionizing radiation is parallel to the orientation of the columns 500; (2) the incident laser beam is directed sufficiently parallel to the orientation of the columns 500; (3) the materials for the columns 300 and gaps 301 are chosen to maximize the internal reflection of the stimulating light by minimizing the critical angle $\alpha$; (4) the materials for the columns 300 and gaps 301 are chosen to maximize the internal reflection of the photostimulated light by minimizing the critical angle $\alpha$; and (5) the entrance to the detector 200 is positioned essentially perpendicular to the direction of the luminescent photons' propagation.

Figure 6:
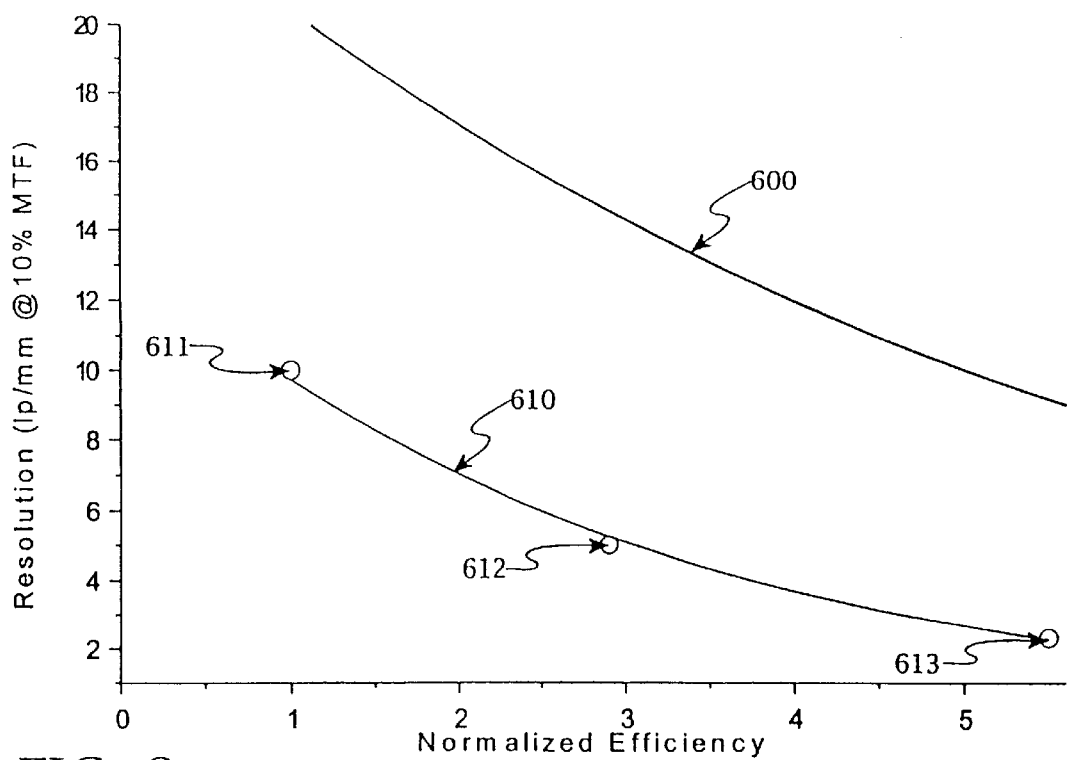
FIG. 6 is a graph of resolution versus efficiency of the relative performance of an isotropic storage phosphor versus anisotropic storage phosphor calculated using point spread function data.

The principal advantage of the auto-collimating property of anisotropic phosphor screens of the present invention is depicted in FIG. 6, a graph comparing the optical spatial resolution, expressed in line-pairs per millimeter, and normalized energy conversion efficiency of the novel anisotropic phosphor screens 600 with a series of conventional isotropic phosphors 610, including commercial product samples 611, 612, and 613. The inverse relationship between the two fundamental determinants of image quality, resolution and efficiency, is observable for both conventional isotropic and auto-collimating anisotropic phosphors.

While the present invention has been described in connection with exemplary embodiments thereof, it will be understood that many modifications in the apparatus will be apparent to those of ordinary skill in the art, and that this application is intended to cover any adaptations or variations thereof. Therefore, it is manifestly intended that this invention be only limited by the claims and the equivalents thereof.

What is claimed:

1. A process for recording and reproducing a radiation image of an object comprising the steps of:

a) causing radiation passing through, or emanating from, said object to be absorbed on a phosphor screen formed of anisotropic, auto-collimating photostimulable phosphor of a material selected from the group consisting of europium-activated barium fluorobromide, europium activated potassium chloride, indium activated potassium bromide and indium activated rubidium iodide, having a total internal reflection for luminescent photons of an angle of incidence greater than a critical angle defined as $$\sin\alpha = n2/n1$$

wherein n1, is the index of refraction of said phosphor and n2 is the index of refraction of a gap material;

b) stimulating said phosphor screen with stimulation rays to release energy of radiation stored therein as fluorescent light; and c) detecting said fluorescent light.

2. An apparatus for recording and reproducing a radiation image of an object, which comprises:

means for causing radiation passing through, or emanating from, said object to be absorbed on a phosphor screen formed of anisotropic, auto-collimating photostimulable phosphor of a material selected from the group consisting of europium-activated barium fluorobromide, europium activated potassium chloride, indium activated potassium bromide and indium activated rubidium iodide, having a total internal reflection for luminescent photons of an angle of incidence greater than a critical angle, defined as $$\sin\alpha = n2/n1$$

wherein n1 is the index refraction of said phosphor and n2 is the index of refraction of a gap material;

means for stimulating said phosphor screen with stimulation rays to release energy of radiation stored therein as fluorescent lights; and means for detecting said fluorescent light.

* * * * *